R. S. JAQUES.
AUTOMOBILE LOCK.
APPLICATION FILED MAR. 1, 1919.
1,340,393.
Patented May 18, 1920.
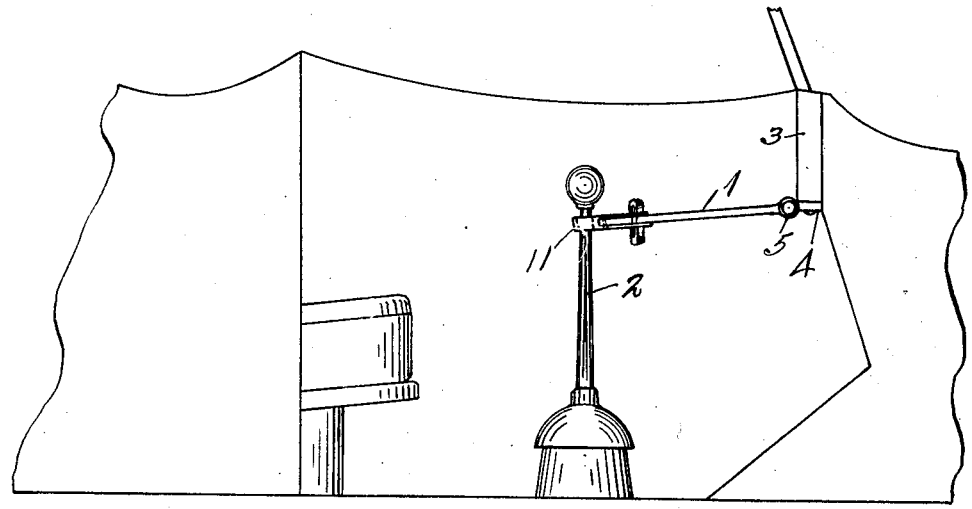
Fig. 1.
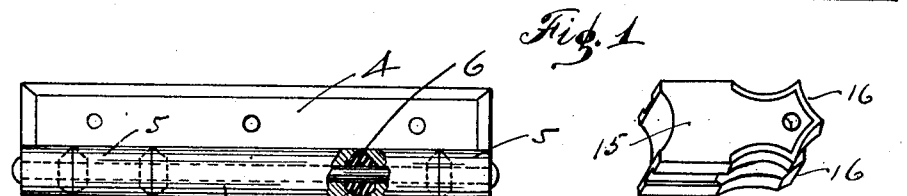
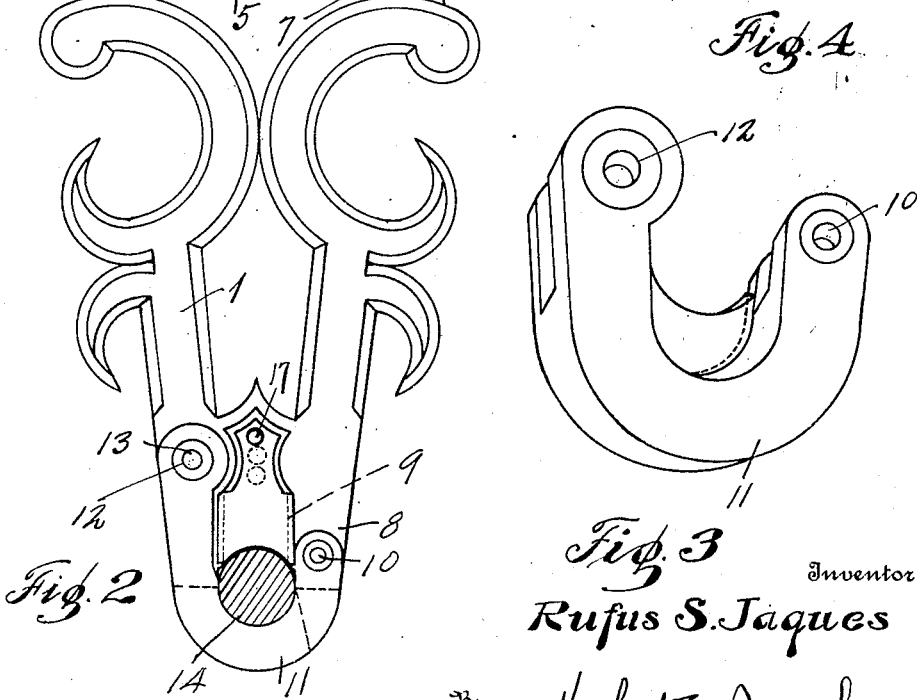
Fig. 2.  Fig. 3.
Inventor
Rufus S. Jaques
By Herbert E. Smith
Attorney

UNITED STATES PATENT OFFICE.

RUFUS S. JAQUES, OF SPOKANE, WASHINGTON.

AUTOMOBILE-LOCK.

1,340,393.  Specification of Letters Patent.  Patented May 18, 1920.

Application filed March 1, 1919. Serial No. 279,992.

*To all whom it may concern:*

Be it known that I, RUFUS S. JAQUES, a citizen of the United States, residing at Spokane, in the county of Spokane and State of Washington, have invented certain new and useful Improvements in Automobile-Locks, of which the following is a specification.

The present invention relates to new and useful improvements in locking means for shift lever of an automobile or other motor vehicles.

One of the objects of the invention is to produce a simple and efficient device capable of locking the shifting lever of a motor vehicle in an intermediate position so that even though the engine is started the vehicle can not be operated.

A further object is to produce a device of this character which may be readily and quickly placed in an operative position or removed from the vehicle if its use is not desired.

A still further object is to construct a locking device of the character referred to that may be connected to the vehicle without requiring any change in the construction of the latter and without marring the vehicle in any manner and which will have an ornamental and useful effect when used in connection therewith.

The invention consists essentially in construction and operation, of a braced lever supported to the body of a vehicle and by which it is possible to engage the gear shift lever and hold it against movement in any direction when engaged and in certain novel combinations and arrangements as will appear hereinafter.

In the accompanying drawings I have illustrated one complete example of the physical embodiment of the invention constructed and arranged according to the best mode so far devised for the practical application of the principles of the invention.

Figure 1 is a side elevation looking into the interior of the car body showing the lever attached to the dash thereof and connecting with the shift lever to hold it against movement.

Fig. 2 is a plan view of the brace bar for holding the shift lever in a neutral position when properly attached.

Fig. 3 is a perspective view of the yoke or latch member for retaining the shift lever to the bar.

Fig. 4 is a perspective view of an adjustable block member by which means it is possible to adapt the present invention to vehicles of various makes.

The device consists essentially in a brace bar member 1 which is provided to fill the gap between the shift lever 2 of an automobile or like vehicle and the dash 3 directly forward thereof. This bar has hinged connection with the plate 4 which is adapted to be secured in any suitable manner to the dash of an automobile. In order to secure certain desired results the hinged joints 5 are formed somewhat after the usual manner but with the addition that the various hinge members are counter-sunk on their ends as at 6 and have inserted therein a resilient material, as hard rubber or fiber 7, which will be disposed to friction and prevent swinging or free movement of the hinge. By the use of such a device it is possible to position the locking bar 1 in any desired position and have it maintain itself there free of outside means for this purpose.

Upon the outer end of the bar as at 8 is formed a rib 9, here shown in dotted lines and engaging one leg of the end 8, at 10, is pivoted a yoke or latch member 11, the pivot being so formed as to be counter-sunk under the faces of the yoke or latch member to prevent its being cut with a chisel or the like. The U-shape latch 11 is provided with bifurcated ends both at the pivot and upon the opposite end which after it is swung around a shift lever will dispose the holes 12 thereon in register with the hole 13 in the bar 1 so that a pad lock hasp may be inserted therethrough and rigidly hold the shift lever against movement in any direction and by reason of the position of the bar 1 will hold the shift lever in a neutral position. By means of the construction here shown it will be evident that a substantial engagement of the shift lever is effected and that no room is left for the insertion of a pry that would tend to twist the engaging members from about the shifting lever which is shown in cross section in Fig. 2 at 14.

To further adapt the present invention to a wide range of use, that is, to make it capable of being applied to cars of various design and make, it is necessary to provide means whereby shift levers of different cross sectional dimensions may be engaged and retained as described. To accomplish this a grooved block 15, is provided for movement on the rib 9. On the extended ends 16 of the block is fastening means for attaching and locating the block to the bar 1. This attachment preferably is secured by means of a pin 17 which may be passed through any of the series of apertures 18 in the plate 1 and the lateral grooves 9' of the block engage the ribs 9 and 9ᵃ of the respective plate end 8 and long arm of the yoke 11, as shown in dotted lines in Fig. 2 of the drawing. When adjusting the device of the present invention to an automobile this block which will be furnished loosely may be adjusted in its proper position with respect to the shift lever 14, the pin inserted through the block and the nearest of the apertures 18 and riveted permanent thereafter.

When attached to the dash of an auto or motor vehicle the bar 1 will normally remain suspended or be pushed back under the dash and be held in that position by reason of the contact of the resilient members 7 in the hinges. When it is desired to leave the car and lock it, the bar 1 is lifted into position, the yoke placed around the shift lever and the hasp of the lock will be inserted through both the yoke and the bar. The shift lever will thus be maintained in a neutral and fixed position and the lever being engaged close to its upper end will maintain the lock in a handy position to insert the key for the purpose of unlocking.

Having thus described the nature of my invention and explained the manner of constructing and using same, and while having adopted the form here shown as both ornamental and substantial for the purpose in mind, I do not desire to be limited to this exact form except in so far as the claims may import.

I claim:—

1. The combination with a hinged plate having a bifurcated end and a series of apertures between said ends, of a U-shape yoke having its short arm pivoted on the longer end portion of the plate and its longer arm adapted to be locked to the shorter end portion of the plate, a locking block having a rivet hole and rivet passed through said hole and a selected aperture of the series and said block having lateral retaining means co-acting with similar means on one end of the plate and on one arm of said yoke.

2. The combination with a hinged locking plate having spaced ends the longer of which is formed with a longitudinal rib, of a U-shape yoke having its short arm pivoted to said longer end and adapted to be locked to the other end of the plate to encircle a shift lever, and a locking block engaging the lever and having a groove to engage said rib and riveted to the plate between its ends.

In testimony whereof I affix my signature.

RUFUS S. JAQUES.